July 2, 1968   J. A. JONELIS   3,390,904

FASTENED ASSEMBLIES

Filed Sept. 26, 1966

INVENTOR
J. A. JONELIS
BY
ATTORNEY 3,390,904
FASTENED ASSEMBLIES
John A. Jonelis, Indianapolis, Ind., assignor to Western Electric Company, Incorporated, New York, N.Y., a corporation of New York
Filed Sept. 26, 1966, Ser. No. 581,781
2 Claims. (Cl. 287—189.36)

ABSTRACT OF THE DISCLOSURE

The subject fastened assembly comprises at least two screws, each having a shank portion with two uniquely spaced threaded shank sections wound with the same pitch, for effecting self-locking action when threaded into two members having complementary threaded openings. The self-locking action of the screws is effected by spacing the trailing thread of the innermost threaded section of each screw from the underside of the head of the screw by the axial distance between at least that outer surface portion of the member which is normally biased against the underside of the head of the screw and the terminating thread in the associated threaded opening of that member which is furthest removed from the head of the screw, as assembled.

---

Figure 1:
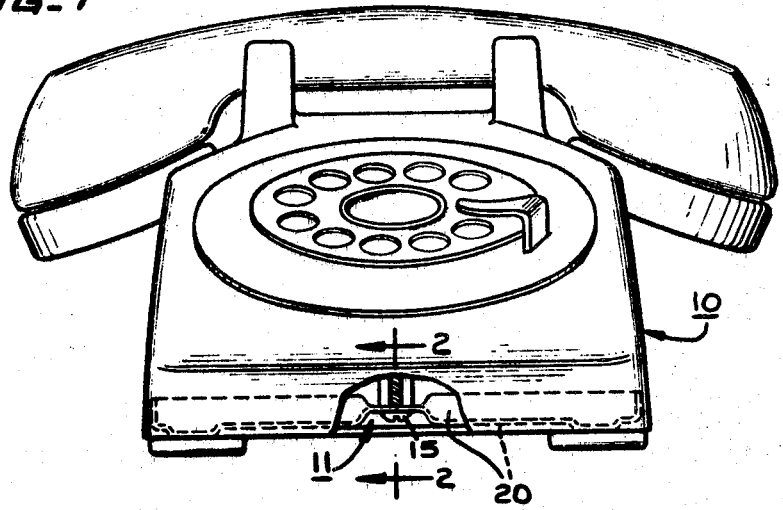

This invention relates to fastened assemblies and, more particularly, to such assemblies utilizing threaded self-locking fastening devices such as screws and the like. It is an object of this invention to provide new and improved assemblies of such character.

In many assembly applications, there is a need for locking screws or the like to hold two or more adjacent members firmly and reliably together. Screws with captive lock washers have often been employed for such purposes. Such screws, however, have the disadvantage of being relatively expensive to manufacture, not only because of the two independent parts being required, but also because of the manufacturing problems encountered in captivating the washer on an unthreaded shank portion of the screw.

In order to minimize such costs, various types of self-locking screws, which obviate the need of a separate washer, have been suggested and utilized heretofore. They have generally fallen into three basic categories: (1) screws wherein one or more threads are either of larger dimensions or deformed relative to the normal threads to effect a binding action in a complementary threaded member into which the screw is inserted, (2) screws wherein a single, slightly oversized threaded shank portion has an axial bore and/or slots cut therein to make it resilient and slightly compressible when threaded into a complementary threaded member, and (3) screws having dual threaded shank sections, either pre-formed, or subsequently deformed by an axial bore and/or slots cut into at least one of the threaded shank sections, to produce a helical discontinuity therebetween, and thereby effect a binding action between the dual threaded sections when the screw is inserted into a complementary threaded member. In some modified versions of the above-mentioned types of self-locking screws suggested heretofore, resilient inserts such as of rubber, plastic and the like have been inserted into the axial bores or slots formed in the shank portions of the screw to augment the locking action.

In the case of self-locking screws relying on a simple dimensional change of one or more threads to effect a binding action within a threaded member, such screws have the disadvantage that once forced into the complementary threaded member, the threads with a discontinuity are generally reshaped by the threads in the complementary member to an extent that if withdrawn for any reason and again re-inserted, the locking or binding action is generally either destroyed or substantially minimized.

With respect to self-locking screws which utilize only one threaded shank section with an axial bore and/or slots formed therein to render such a section resilient, such a construction obviously imposes manufacturing difficulties, and the specialized tooling required to form the axial bore or slots adds appreciable cost to the manufacture of the basic screw itself.

As for the prior self-locking screws which utilize two spaced threaded shank sections to effect a locking action, such action has not only necessitated a purposely established helical discontinuity between the two threaded shank sections, but the first thread of the threaded shank section in closest proximity to the head has always started immediately beneath the head of the screw. This has apparently been done under the assumption that in the case of fastening two complementary threaded members together, whether they are to be in contacting or spaced relationship, the threads of the two sections of the screw must respectively engage in a binding relationship the threads of the fastened members in order that reliable locking action of the screw be effected. As will be disclosed in detail hereinafter in accordance with the principles of this invention, such simultaneous screw thread engagement is not always necessary to effect a reliable self-locking action of the screw.

Moreover, the forming of screw threads immediately beneath the head of a screw has been found to shorten the life of the tooling when the threads are rolled, for example, on the shank of the screw.

It has further been found in prior self-locking screws utilizing dual threaded sections that the threaded section immediately beneath the head of the screw often can impose several problems to assembly personnel. More specifically, it has been found that such personnel have the tendency many times to stop turning the screw when the lead thread of the section immediately beneath the head of the screw contacts the complementary threaded member within which it is to be inserted, the increase in torque causing them to think that the head has bottomed. In other situations, especially where such a complementary threaded member is relatively thin and has a tapped hole comprising only several threads, an assembler can easily twist the screw with sufficient force to actually rupture the threads on the screw shank immediately beneath the head of the screw and/or the threads of the member is engageable therewith.

Accordingly, it is another object of this invention to provide fastened assembly wherein each self-locking screw thereof is of a type which obviates the need for an axial bore or straight or helical slots formed in the shank portion of the screw, or of auxiliary resilient inserts associated therewith.

It is a further object of this invention to provide a fastened assembly wherein each self-locking screw thereof minimizes the false assumption by an assembler that the head of the screw has bottomed during assembly.

It is an additional object of this invention to minimize possible impairment of the screw threads relied upon to effect a self-locking action in a fastened assembly, such as caused by excessive twisting of the screw after complete turn down within a complementary threaded member or members.

It is still another object of this invention to provide a fastened assembly wherein the self-locking screws thereof are of uniquely simple, durable and economical construction.

In accordance with the principles of the present invention in one illustrative embodiment and application therefor, each self-locking screw of a fastened assembly comprises two uniquely positioned threaded shank sections which obviate the need for a separate lock washer to hold a relatively thin, threaded base plate firmly in spaced relationship with respect to the housing of certain telephone sets. It is to be understood, of course, that the self-locking screw embodied herein has universal application in any situation wherein two or more moplementary threaded members are to be held in fixed relationship with respect to each other by means of a threaded fastening device.

In accordance with an aspect of the invention, one threaded shank section comprises only several threads starting approximately the width of the base plate beneath the underside of the head of the screw, with the other section comprising a plurality of threads extending from an intermediate point along the shank of the screw to the terminating end thereof. While the treads of the second section form a spaced helical continuation of the threads in the first section, such a relationship does not intentionally exist between the threads in the tapped hole of the base plate, when in is normal position, and the threads in a screw-receiving insert secured within the telephone housing.

As a result, upon advancing the screw into the insert the lead thread of the first section, which section is formed in closest proximity to the head of the screw, will not freely engage the lead thread in the tapped hole of the base plate until the latter is moved away from the housing to a position where the start points of the threads in the base plate and in the insert fall along a common projected helical path. Conversely, after the head of the screw has been turned down tightly against the base plate, the trailing screw thread of the first threaded section will thereafter normally not engage the training thread of the base plate until the latter has been moved away from the housing a short distance. For this to happen accidentally with two or more screws of the type embodied herein employed to hold the base plate, all of the screws would have to loosen simultaneously which is a very remote possibility in most applications.

It is thus seen that with the trailing thread of the first section of the screw in closest proximity to the underside of the head being spaced therefrom by approximately the axial length of the tapped hole in the threaded base plate in accordance with the principles of the present invention, the false assumption by an assembler that the head of the screw has bottomed against the base plate is substantially minimized. This follows from the fact that as the lead thread of the first section contacts the tapped hole of the base plate, the head of the screw is still spaced from the base plate by at least the thickness dimension of the latter, this spacing being readily observable to an assembler.

In addition, once the first threaded section, comprised of only several threads, has been advanced completely through the complementary threaded member, excessive twisting applied to the screw can no longer rupture or destroy any of the threads in the first threaded section, and especially the trailing thread of that section which is relied upon to effect the self-locking action.

Figure 2:
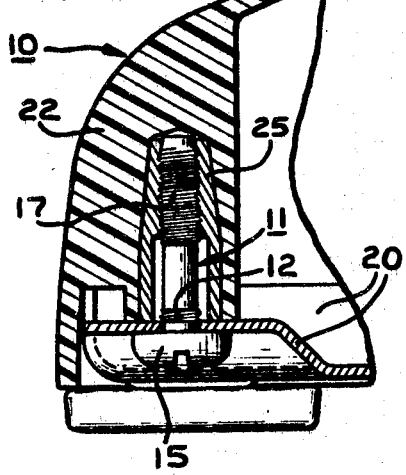
Figure 3:
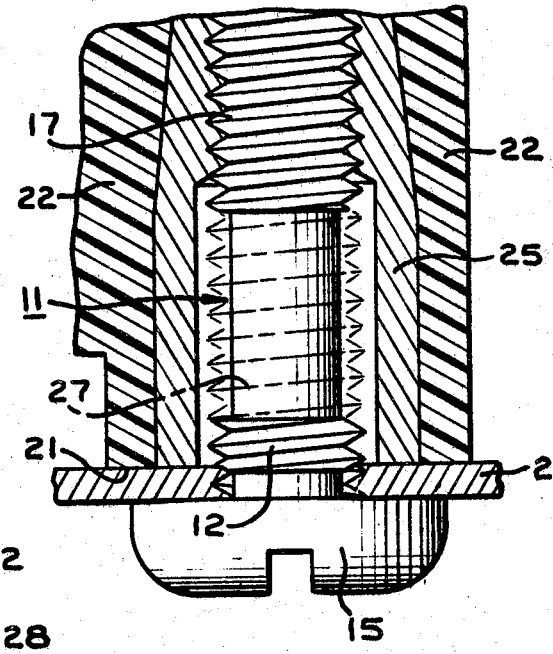
Figure 4:
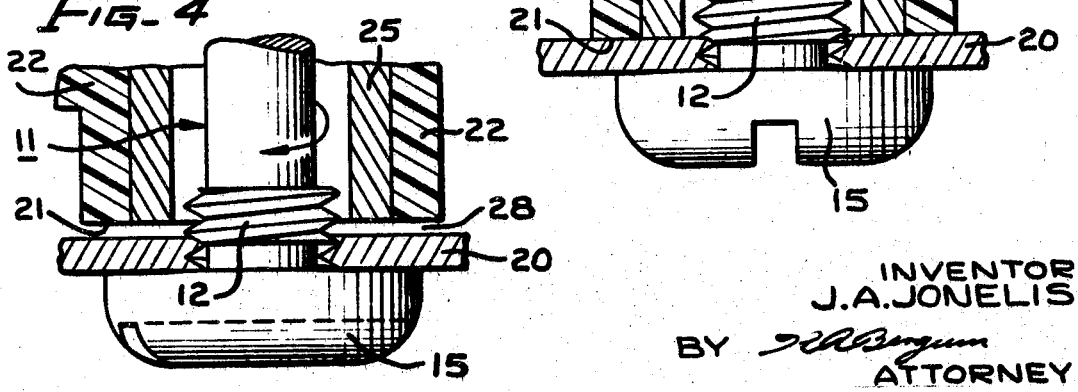

These and other objects, features and advantages of the present invention will become more fully understood from a consideration of the following detailed description and related accompanying drawing thereof, in which:

FIG. 1 is a perspective view of a typical telephone set in which two or more self-locking screws of the type embodied herein are employed to secure the base plate firmly and reliably against the housing of the handset;

FIG. 2 is an enlarged, fragmentary view, mainly in section, taken along the line 2—2 of FIG. 1, illustrating the relationship of one of the two self-locking screws relative to the other parts of the telephone handset associated therewith, and FIGS. 3 and 4 are enlarged, fragmentary views, mainly in section, illustrating two different positions of the threads in the first threaded section nearest the head of the self-locking screw embodied herein relative to the base plate held thereby in order to effect respectively reliable locking and withdrawal of the screw.

Considering now the drawing in greater detail, FIG. 1 is a perspective view of a typical telephone set 10 in which two self-locking screws 11 (only one being illustrated) embodying the principles of the present invention are employed. It is to be understood that the self-locking screws embodied herein are shown in conjunction with a telephone set only by way of example, and that these screws have utility as fastening devices in numerous other assembly applications.

As best in in FIG. 2, the self-locking screw 11 has a first threaded shank section 12 positioned in close proximity to, but not immediately adjacent, the underside of a head portion 15 of the screw, and a second threaded section 17 spaced from the first threaded section 12 and terminating at the shank end of the screw. The first threaded section 12, as best seen in FIG. 3, comprises only several threads, actually two in the illustrative embodiment, with the trailing thread of the first section being spaced from the underside of the head 15 by approximately the distance of a base plate 20, which in the illustrative telephone set is approximately .03" in thickness.

It should be understood, of course, that the spacing between the trailing thread of the first section 12 and the underside of the head of the screw is not necessarily determined by the thickness dimension, as measured throug hthe tapped opening, of the member to be biased against the head. What is determinative of the spacing in question is the distance between the terminating thread of the tapped opening furthest removed from the head of the screw, as assembled, and that outer surface portion of the associated member which is to be biased directly against the underside of the screw head. Hence, the terminating thread in question may either terminate at the outer surface of the associated member, as is the case with the base plate 20 depicted herein, or it may terminate within an opening having an axial length considerably longer than that of the internal tapped region. Concomitantly, the terminating thread in question of the tapped opening may be spaced a considerable distance from the surface area of the member which is to be in contact with the head of the screw, such as in the case where the threaded opening is formed in a recessed or cup-shaped area of the member in question.

In the illustrative application, the two screws 11 secure the base plate 20 firmly against recessed mating surfaces 21 of a telephone housing 22. The second threaded shank section 17 of the screw is normally inserted into a complementary threaded insert 25 which is molded into the housing. In one particular telephone set, the housing, of course, is of molded plastic, the base plate is of steel, the insert is of brass and the self-locking screws are of steel, AISI C–1038, GR2, Cold HD wire 57650, zinc plated to a thickness of .0002". The threads of the screw are .164–32" UNC–2A Mod. (finish allowance .001"), major diameter .1611"–.1561" (P.D., .1407"–.1376" before plating; max. P.D. .1426" after plating). The type of material employed for the screw and the dimensions of the screw and of the threads on the shank portion thereof will, of course, depend upon the particular application involved, with such factors being based on well-known design considerations As best illustrated in FIG. 3, the threads of the second section 17 form a spaced helical continuation of the threads in the first section 12, as evidenced by the dashed line 27 extending between the two threaded sections.

Such a matching helical relationship, however, does not intentionally exist between the threads in the tapped hole of the base plate 20, when in its normal position depicted in FIGS. 1–3, and the threads in the screw-receiving insert 25 molded within the housing 22. As a result, the lead thread of the first threaded shank section 12 of the screw will not normally freely engage adjacent terminating lead thread in the aligned tapped hole in the base plate 20 until the latter is moved away from the housing 22 to a position where the start point of the threads in question fall along a common, projected helical path. Such a position of the base plate is illustrated in FIG. 4.

Conversely, after the screw has been turned down with the underside of the head thereof biased tightly against the base plate 20, the trailing screw thread of the first section 12 will thereafter normally not freely engage the immediately adjacent terminating thread in the aligned tapped hole of the base plate 20 until the latter has been moved away from the telephone housing 22 a short distance, such as represented by the spacing 28 depicted in FIG. 4. In order for this to happen accidentally when two or more self-locking screws of the type embodied herein are employed to hold the base plate, all of the screws would have to loosen simultaneously, which situation is a very remote possibility.

In addition to the simple, durable and inexpensive construction of the self-locking screw assembly embodied herein, there are a number of other advantages that result from the use of the two uniquely positioned threaded sections on the shank of each screw.

More specifically, by having the trailing thread of the first threaded shank section 12 start at a point spaced from the underside of the head 15 by a distance approximately equal to the thickness of the threaded member normally encompassing this shank region, such as the base plate 20, the life of the tool involved in forming the threads by a rolling operation, for example, is greatly increased as the top thread of the die can be beveled to reduce spalling.

In addition, with the screw thread spacing in question, the tendency of an assembler to sense falsely that the head thereof has bottomed is substantially minimized. This results from the fact that when the lead thread of the first threaded section 12 encounters the lead thread in the tapped hole of the base plate, the head of the screw is still an appreciable distance above the upper surface of the base plate against which it is to be biased. Accordingly, a mere visual examination on the part of an assembler, or the mechanical sensing by an automated screw-driving apparatus, of the elevated position of the screw head relative to the base plate would dictate the need for continued turn down of the screw.

In addition, by having the several threads of the first section 12 spaced from the underside of the head by approximately the tapped thickness dimension of the base plate in accordance with the principles of this invention, excessive twisting of the screw by an assembler, for example, could not result in the rupture or destruction of the threads in the first section once the head of the screw is turned down against the base plate. At that point, of course, none of the threads in the first section are in full engagement with the complementary threads in the base plate.

Concomitantly, as there is no reliance placed on purposely forcing the threads of the first section 12 into the complementary threaded hole of the base plate, i.e., with an intentional helical discontinuity being relied upon to effect a self-locking characteristic, the threads in neither the first nor second shank sections are normally either partially or wholly deformed or reshaped in a normal assembly operation involving the turn down of the screw. As illustrated in FIG. 4, if any binding action is initially encountered during the turn down of the screw, an assembler, by merely allowing the base plate 20 to be displaced from the associated member, such as by the distance 28, will insure that the screw may be turned down freely until the first threaded section 12 is in the position depicted in FIG. 3 relative to the base plate 20. Such unimpeded turn down is important because any deformation of the screw threads, and particularly the trailing thread of section 12, could seriously impair, if not destroy, the self-locking action thereof should a screw be withdrawn for any reason after assembly and subsequently re-inserted into the complementary threaded members during the re-assembly thereof.

Finally, the utilization of dual threaded shank sections spaced apart from each other allows each screw to be withdrawn from one member, such as the insert in the illustrative embodiment, and still be held "captive" by the other member, such as the illustrated base plate. This can be particularly advantageous in applications where the apparatus assembled by such screws may require periodic servicing or maintenance by persons with diverse skills, such as encountered in the field.

It is to be understood that the specific illustrative embodiment described herein is merely representative of the general principles of the present invention. Various other modifications may be devised in the light of this disclosure by one skilled in the art without departing from the spirit and scope of this invention.

What is claimed is:

1. A fastened assembly comprising:
  a first member having at least two spaced threaded openings therein;
  a second member normally positioned in fixed relationship with respect to said first member, and having two threaded openings respectively in register with the threaded openings in said first member, with at least an unthreaded region extending between at least the threaded portions of each pair of openings in register;
  a separate self-locking fastening device, including an elongated cylindrical shank portion and a terminating head portion integral therewith, threaded into each aligned pair of openings in said first and second members, the shank portion of each of said fastening devices having two spaced threaded sections disposed along the length thereof, a first threaded section starting at a point spaced from the underside of the head portion by approximately the distance between at least that outer surface portion of the first member which is normally biased against the underside of the head of each fastening device and the terminating thread in the associated threaded opening of said first member which thread is furthest removed from said head as normally assembled, said trailing thread of the first threaded section is thereby normally positioned immediately adjacent to but out of engagement with the adjacent terminating thread in the associated opening of said first member, the second threaded shank section of each of said fastening devices being further removed from said head portion and terminating at the end of said shank portion opposite said head portion, each of said second threaded shank sections respectively engaging the threads in the associated one of the threaded openings of said second member.

2. A fastened assembly in accordance with claim 1, wherein in each of said fastening devices said first threaded section comprises only several threads, said second threaded section comprises a plurality of threads extending from an intermediate region along said shank portion to the terminating end thereof, wherein said second threaded shank section forms a projected helical continuation of the first section, and wherein each aligned pair of threaded openings in said first and second members normally establishes a projected helical discontinuity therebetween when said members are secured in their desired fixed positions relative to each other by said fastening devices.

References Cited

UNITED STATES PATENTS

| | | | |
|---|---|---|---|
| 2,259,217 | 10/1941 | Stevenson | 151—69 |
| 2,272,178 | 2/1942 | McDowell et al. | 151—69 |
| 2,929,474 | 3/1960 | Boardman | 151—69 |
| 3,195,600 | 7/1965 | Middleton | 151—69 |

EDWARD C. ALLEN, *Primary Examiner.*

R. S. BRITTS, *Assistant Examiner.*